(12) United States Patent
Igawa

(10) Patent No.: US 6,679,522 B2
(45) Date of Patent: *Jan. 20, 2004

(54) AIRBAG

(75) Inventor: Tadahiro Igawa, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/356,529

(22) Filed: Feb. 3, 2003

(65) Prior Publication Data

US 2003/0116951 A1 Jun. 26, 2003

Related U.S. Application Data

(63) Continuation of application No. 09/909,841, filed on Jul. 23, 2001, now Pat. No. 6,572,144.

(30) Foreign Application Priority Data

Aug. 4, 2000 (JP) ........................................ 2000-236400

(51) Int. Cl.[7] ............................................... B60R 21/16
(52) U.S. Cl. .................................. 280/743.1; 280/743.2
(58) Field of Search ........................... 280/743.1, 743.2, 280/742, 731, 732, 728.1

(56) References Cited

U.S. PATENT DOCUMENTS

| | | | | |
|---|---|---|---|---|
| 3,879,057 A | * | 4/1975 | Kawashima et al. | 280/743.2 |
| 5,078,423 A | * | 1/1992 | Fujita | 280/743.2 |
| 5,516,146 A | * | 5/1996 | Kopitzke | 280/728.2 |
| 5,669,632 A | * | 9/1997 | Johnson et al. | 280/743.2 |
| 5,678,858 A | * | 10/1997 | Nakayama et al. | 280/743.2 |
| 6,315,324 B1 | * | 11/2001 | Keshavaraj | 280/743.2 |

FOREIGN PATENT DOCUMENTS

| | | | | |
|---|---|---|---|---|
| JP | 03136942 A | * | 6/1991 | B60R/21/16 |

* cited by examiner

Primary Examiner—Paul N. Dickson
Assistant Examiner—Faye M. Fleming
(74) Attorney, Agent, or Firm—Kanesaka & Takeuchi

(57) ABSTRACT

An inflatable airbag includes a rearwardly directed surface to be contacted by the occupant when expanded, an end located at a side opposite to the rearwardly directed surface and having a hole for receiving an inflation gas, and laterally spaced side surfaces extending between the rearwardly directed surface and the end, and oriented substantially vertically in the passenger compartment. The side surfaces have inwardly extending depressions formed in a middle portion of each side surface of the airbag as viewed in a vertical direction and located away from the rearwardly directed surface to restrict movement of the inflation gas inside the airbag when the occupant hits the inflated airbag.

5 Claims, 17 Drawing Sheets

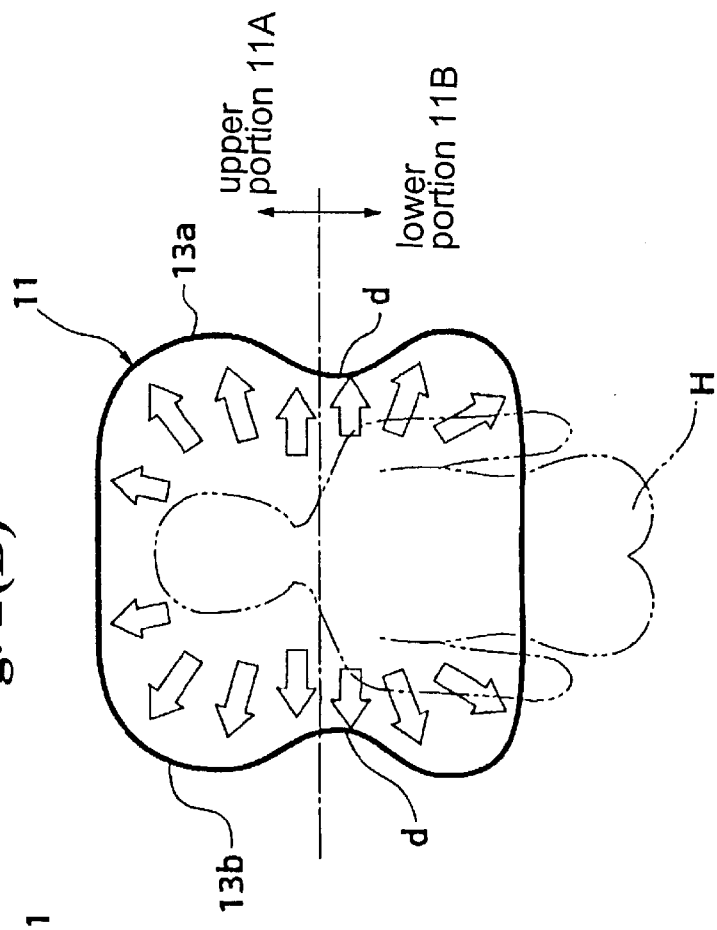
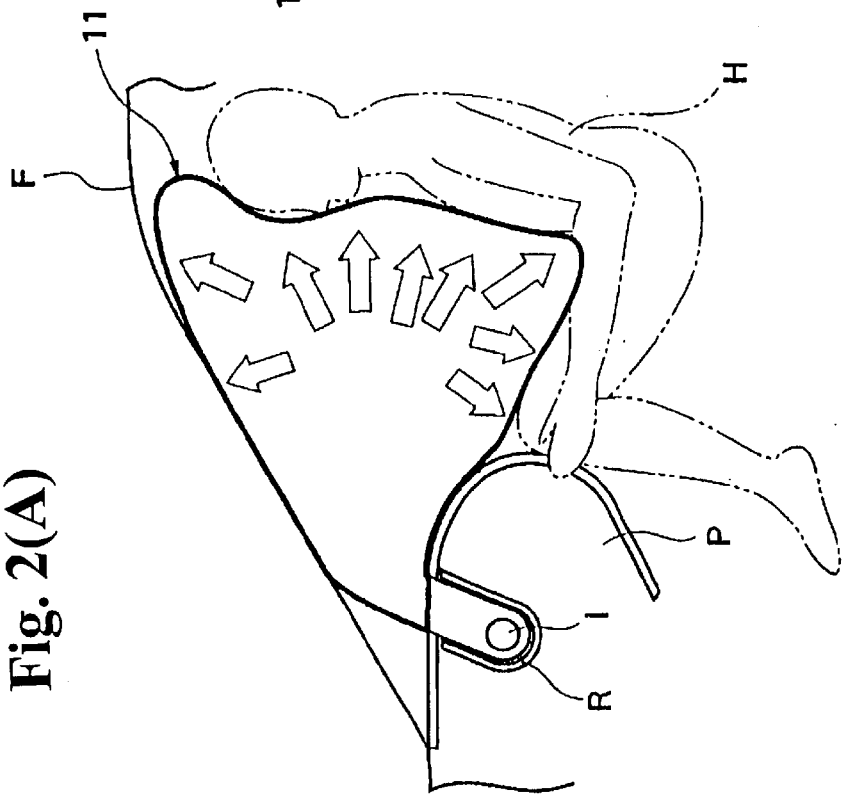

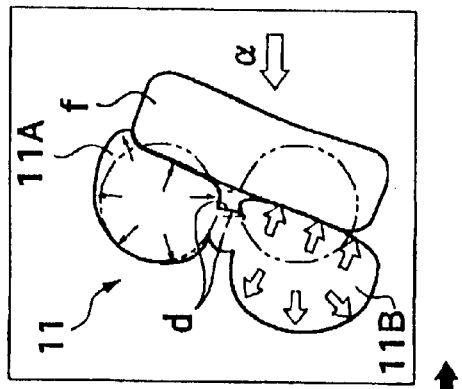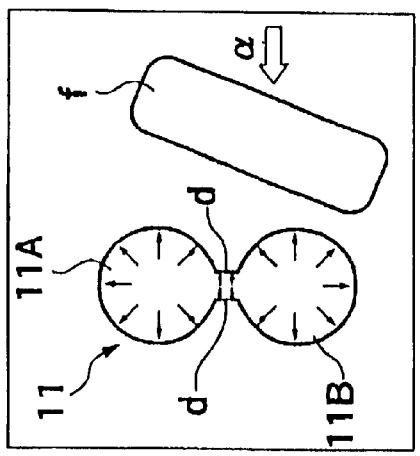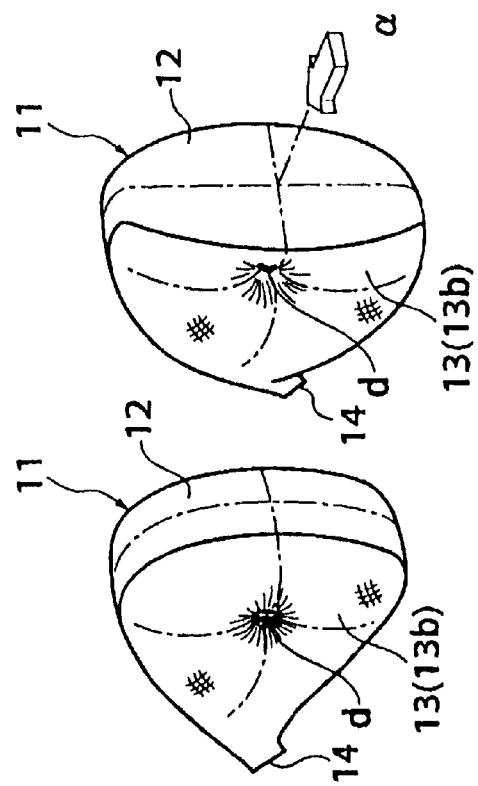

Fig. 7(A)
Fig. 7(B)
Fig. 7(C)
Fig. 7(D)
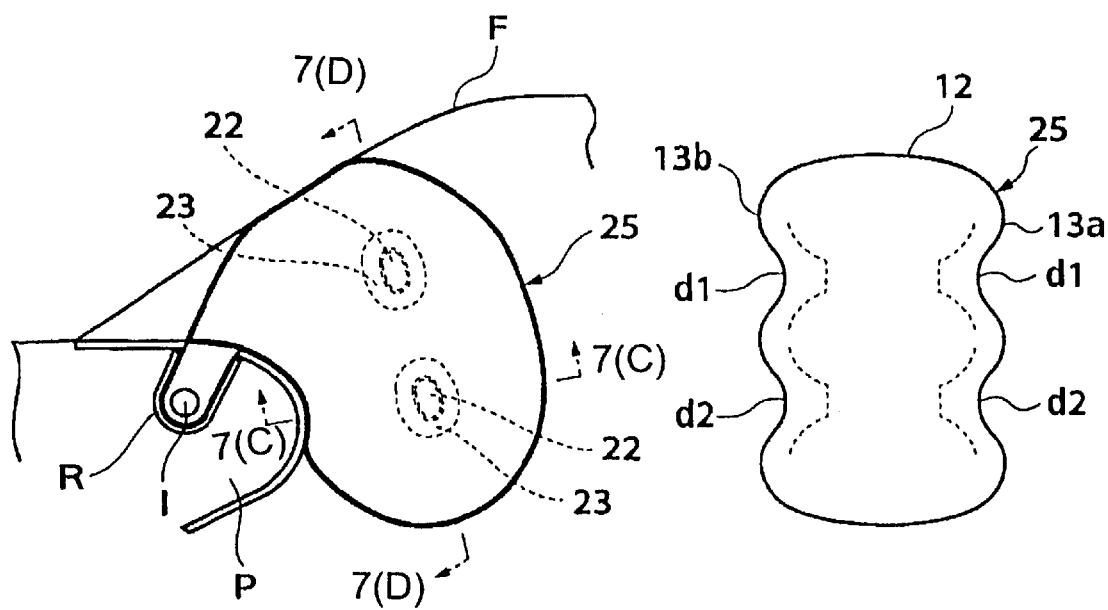
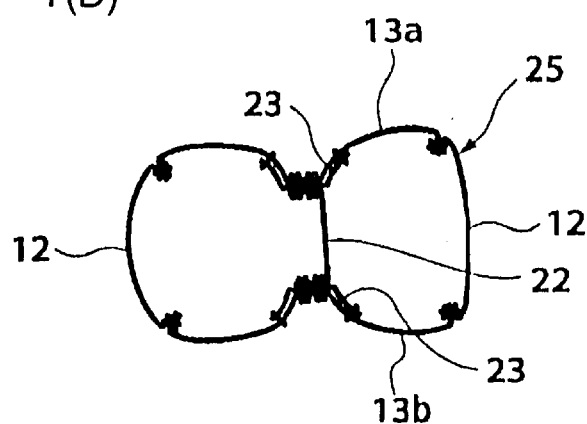
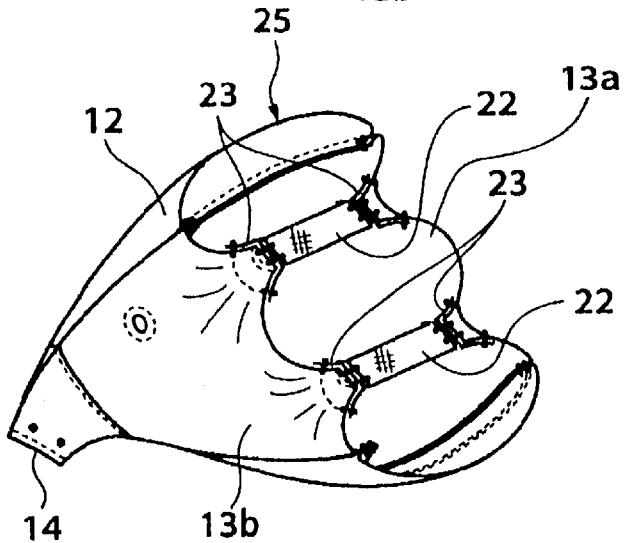

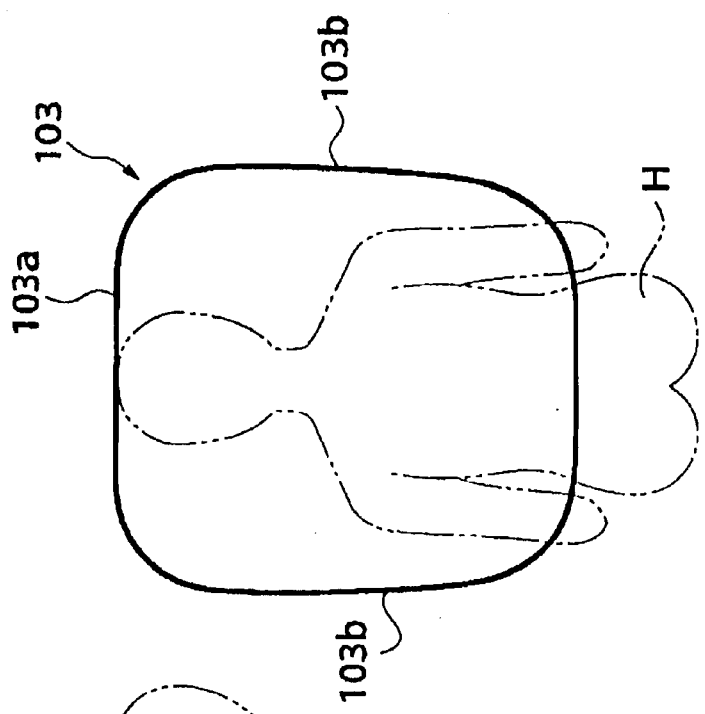
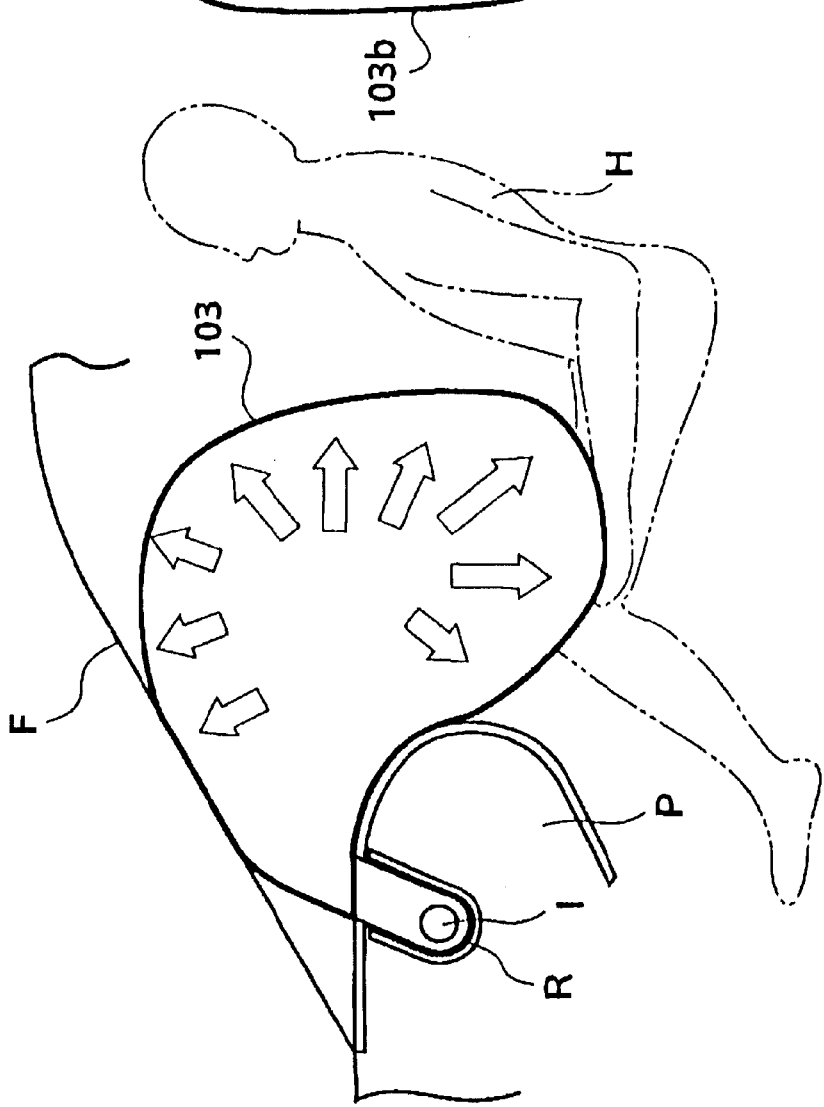
Fig. 14(A) Prior Art
Fig. 14(B) Prior Art

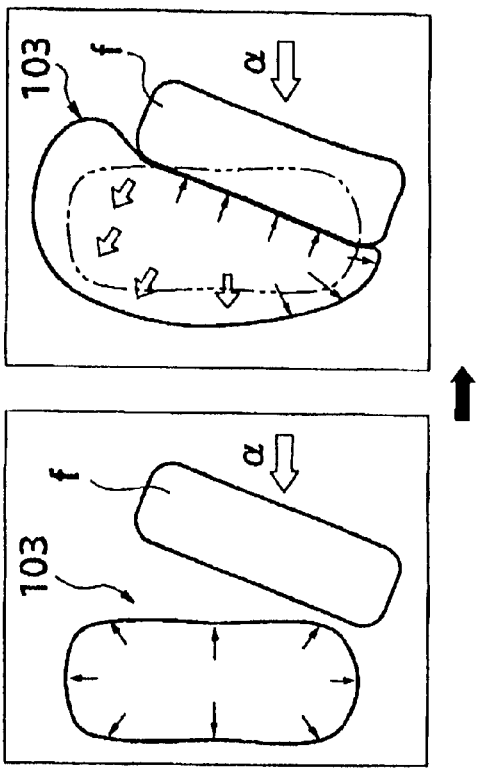
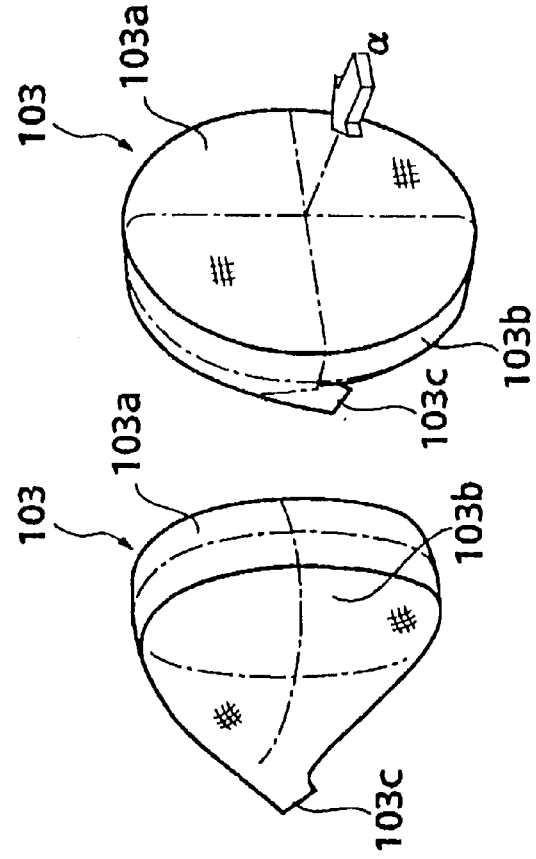

US 6,679,522 B2

AIRBAG

CROSS REFERENCE TO RELATED APPLICATION

This is a continuation application of Ser. No. 09/909,841 filed on Jul. 23, 2001, now U.S. Pat. No. 6,572,144.

BACKGROUND OF THE INVENTION AND RELATED ART STATEMENT

The present invention relates to an airbag for protecting an occupant as a result of expanding during an emergency in a vehicle.

In order to protect an occupant during a collision in a vehicle, a driver airbag device, a passenger airbag device, a back-seat airbag device, and a side airbag device are used. Of these various types of airbag devices, the passenger airbag device is accommodated inside an instrument panel disposed at the front side of the vehicle. Of the different types of passenger airbag devices, the type of passenger airbag device which is disposed at a windshield-opposing location of the top portion of the instrument panel is called a top-dash-mount-type passenger airbag device.

Hereunder, a description of an airbag device will be given taking a top-dash-mount-type passenger airbag device as an example.

FIG. 14(A) is a schematic side view used to illustrate the form of a conventional passenger airbag device when it has finished spreading. FIG. 14(B) is a front view thereof.

FIG. 15(A) is a schematic side view used to illustrate the form of the conventional passenger airbag device when a load acts thereupon (that is, when an occupant moves forward). FIG. 15(B) is a front view thereof.

FIG. 16(A) is a perspective view showing the conventional airbag in an expanded state. FIG. 16(B) is a perspective view showing the airbag in a squashed state when a load acts thereupon. FIGS. 16(C) and 16(D) are schematic views used to illustrate the characteristics of the squashed state of the airbag when a load acts thereupon.

The passenger airbag device shown in FIGS. 14(A) and 15(A) comprises a retainer R disposed at a windshield-opposing location of the top portion of an instrument panel p of a vehicle. Inside the retainer R are disposed an airbag 103 and an inflator I for supplying spread gas into the interior of the airbag 103. As simply shown in FIG. 16(A), the airbag 103 is a three-piece bag in which two pieces of side cloths 103b are sewed, one at each side of one piece of strip-like central cloth 103a interposed therebetween. The airbag 103 has an open end (that is, a gas-circulation hole) 103c which is narrowed down thinly at the base of the airbag 103. The open end 103c merges with a space in the inflator I. The airbag 103 is accommodated in a folded state inside the retainer R.

A description of the operation of the passenger airbag device will now be given.

At the time of a collision of a vehicle, spread gas is supplied into the airbag 103 from the inflator I. This causes the airbag 103 to expand in front of an occupant H, as shown in FIGS. 14(A) and 14(B). When the spreading of the airbag 103 is completed, the side cloths 103b extend in smooth curved forms or substantially straight lines from top to bottom portions thereof, as shown in FIG. 14(B). Here, the internal pressure or resistance inside the airbag 103 is substantially uniform at the top and bottom portions thereof.

After the airbag 103 has spread, as shown in FIG. 15(A), the occupant H that moves forward due to inertial force hits the airbag 103. This causes the airbag 103 to be pushed and squashed as a result of being sandwiched between the instrument panel P and the windshield F and the occupant H. At this time, as shown in FIG. 15(B), the upper portion of the airbag 103 spreads horizontally by a greater amount than the lower portion thereof. The following factors (1) to (3) cause the airbag 103 to be in a squashed state.

(1) As simply shown in FIG. 15(B), regarding the areas of the portions of the upper part of the body (from the waist upward) of the occupant H that hits the airbag 103, the area of the upper portion of the upper body (from the neck upwards) is smaller than the area of the lower portion of the upper body (from the shoulders downward).

(2) Regarding the masses of the portions of the upper body of the occupant H, the mass of the upper portion of the upper body is smaller than that of the lower portion of the upper body.

(3) While the lower portion of the airbag 103 is pushed upward by the knees of the occupant H, the upper portion of the airbag 103 is relatively not pushed.

When an attempt is made to correct the characteristics of the squashed state of the airbag 103, the output of the inflator I must be set relatively high.

A description of the resistance on the airbag 103 when a load is exerted thereupon will now be given with reference to FIG. 16.

When the occupant hits the airbag 103 shown in FIG. 16(A) from the front surface of the airbag 103, an external force a shown in FIG. 16(B) acts upon the airbag 103. As shown in the same figure, this causes the airbag 103 to become squashed while spreading flatly. Here, as shown schematically in FIGS. 16(C) and 16(D), the airbag 103 escapes towards a region of lower resistance (that is, in the directions of empty arrows inside the bag 103), so that the resistance against a load body f becomes smaller, thereby making it easier to squash the bag.

In view of the above-described problems, it is an object of the present invention to provide an airbag which has a more preferable spread form without increasing the output of an inflator.

SUMMARY OF THE INVENTION

To overcome the above-described problems, according to the present invention, there is provided an airbag for protecting an occupant as a result of expanding during an emergency in a vehicle, wherein, in a front form of the airbag at the time of expansion thereof as viewed from the occupant, an inwardly extending depression is formed in a middle portion of a side surface of the airbag as viewed in a vertical direction.

When the occupant collides against the airbag, the depression at the middle portion of the airbag makes it difficult for the gas in the bottom portion of the bag to move upward. Consequently, the resistance at the bottom portion of the bag effectively acts upon the occupant. Therefore, it is possible to provide an airbag which has a more preferable spread form without increasing the output of the inflator.

BRIEF DESCRIPTION OF THE DRAWINGS

FIG. 2(A) is a schematic side view showing the form of the passenger airbag device of the embodiment of the present invention when a load acts thereupon (that is, when an occupant moves forward);

FIG. 2(B) is a front view thereof;

FIG. 3(A) is a perspective view showing the state of the airbag of the present invention when it is expanded;

FIG. 3(B) is a perspective view showing the squashed state of the airbag when a load acts thereupon;

FIGS. 3(C) and 3(D) are schematic views used to illustrate the characteristics of the squashed state of the airbag when a load acts thereupon;

FIG. 7(A) is a schematic side view of a top-dash-mount-type passenger airbag device using two tether straps;

FIG. 7(B) is a front view of the airbag shown in FIG. 7(A);

FIG. 7(C) is a sectional view taken along line 7(C)—7(C) of FIG. 7(A);

FIG. 7(D) is a sectional view taken along line 7(D)—7(D) of FIG. 7(A);

FIG. 14(A) is a schematic side view used to illustrate the form of a conventional passenger airbag device when it has finished spreading;

FIG. 14(B) is a front view thereof;

FIG. 16(A) is a perspective view showing the conventional airbag in an expanded state;

FIG. 16(B) is a perspective view showing the airbag in a squashed state when a load acts thereupon;

FIGS. 16(C) and 16(D) are schematic views used to illustrate the characteristics of the squashed state of the airbag when a load acts thereupon;

DETAILED DESCRIPTION OF PREFERRED EMBODIMENTS

Hereunder, a description will be given with reference to the drawings.

In the description of the following embodiments, an airbag of the present invention is described as being a top-dash-mount-type passenger airbag device.

Figures 1A, 1B:
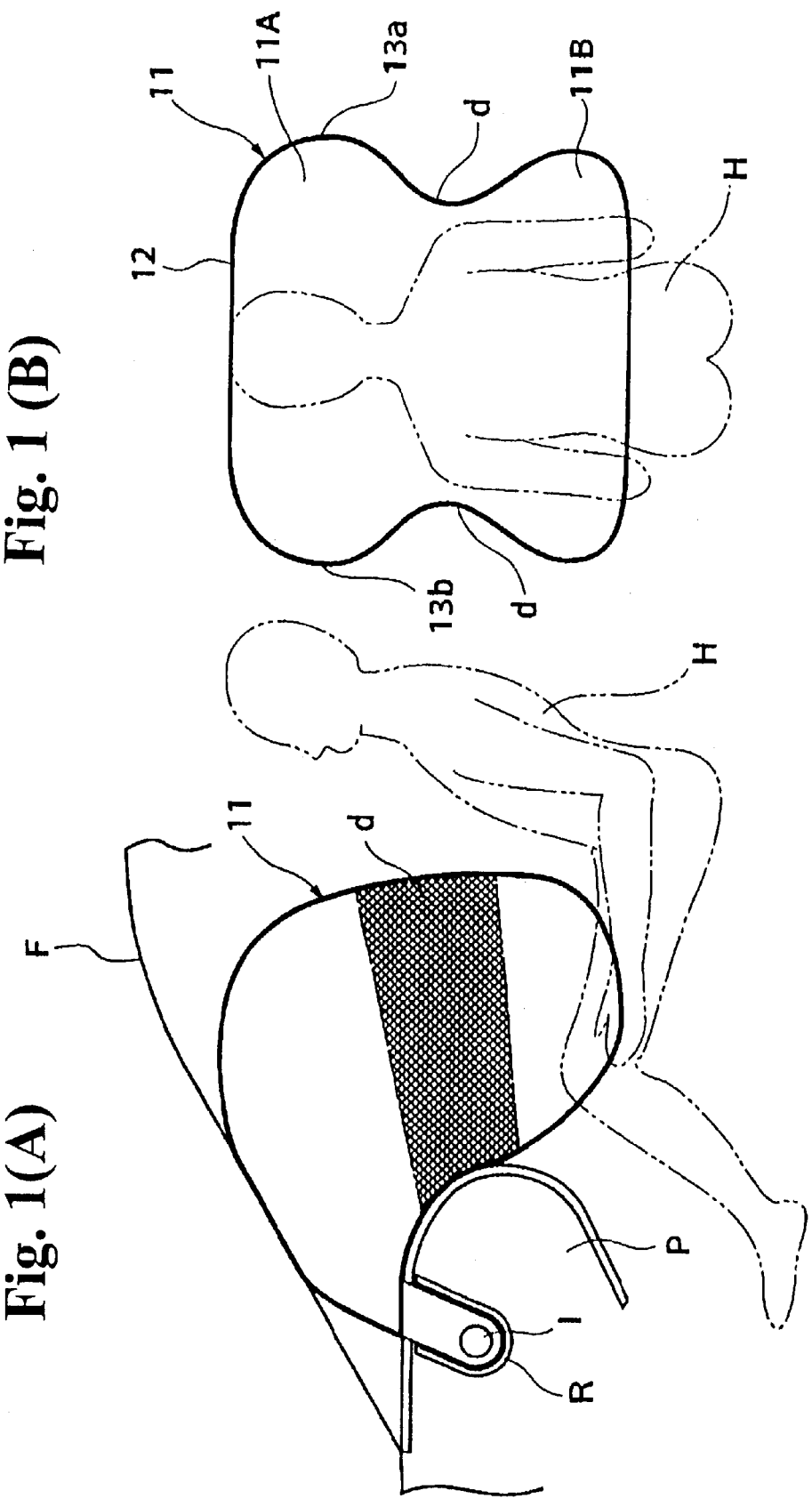
FIG. 1(A) is a schematic side view showing the form of a passenger airbag device of an embodiment of the present invention when it has finished spreading.
FIG. 1(B) is a front view thereof.

FIG. 1(A) is a schematic side view showing the form of a passenger airbag device of an embodiment of the present invention when it has finished spreading. FIG. 1(B) is a front view thereof.

FIG. 2(A) is a schematic side view showing the form of the passenger airbag device of the embodiment of the present invention when a load acts thereupon (that is, when an occupant moves forward). FIG. 2(B) is a front view thereof.

FIG. 3(A) is a perspective view showing the state of the airbag of the present invention when it is expanded. FIG. 3(B) is a perspective view showing the squashed state of the airbag when a load acts thereupon. FIGS. 3(C) and 3(D) are schematic views used to illustrate the characteristics of the squashed state of the airbag when a load acts thereupon.

Figure 4A:
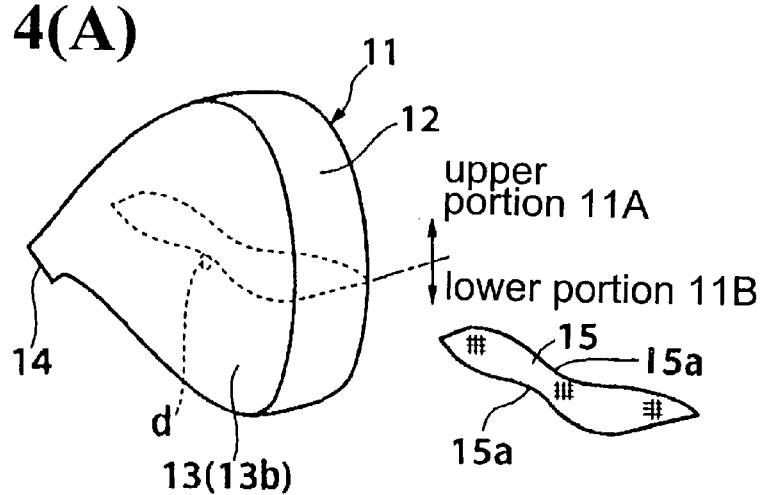
FIG. 4(A) is a perspective view showing a structural example (that is, a partition-type structure) of the airbag of the present invention.
Figure 4B:
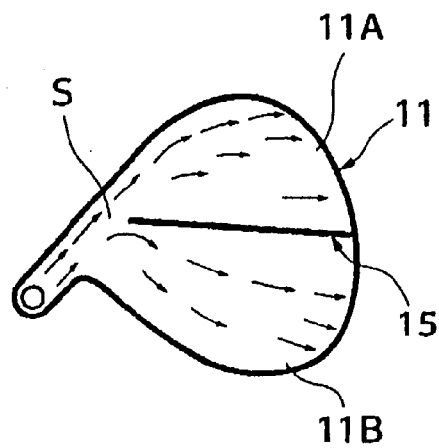
FIG. 4(B) is a vertical sectional view of FIG. 4(A)
Figure 4C:
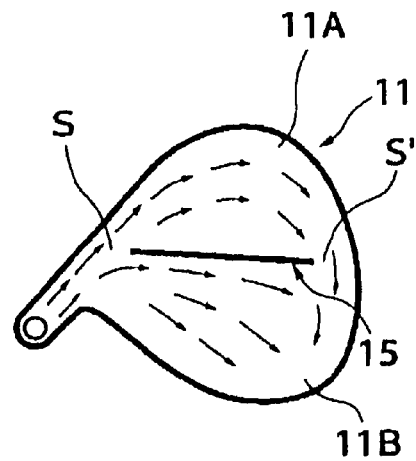
FIG. 4(C) is a vertical sectional view of another example of the airbag.

FIG. 4(A) is a perspective view showing a structural example (that is, a partition-type structure) of the airbag of the present invention. FIG. 4(B) is a vertical sectional view of FIG. 4(A). FIG. 4(C) is a vertical sectional view of another example of the airbag.

The airbag device shown in FIGS. 1(A) and 2(A) comprises a retainer R disposed at a windshield-opposing location of the top portion of an instrument panel P of a vehicle. Inside the retainer R are disposed an airbag 11 made of cloth, and an inflator I for supplying spread gas into the airbag 11. Ordinarily, the airbag 11 is accommodated in a folded state inside the retainer R.

As simply shown in FIG. 4(A), the airbag 11 is a three-piece bag which is formed by sewing together one piece of strip-like central cloth 12 and two side cloths 13 (13a and 13b) one at each side of the central cloth 12. The airbag 11 has an open end (that is, a gas circulation hole) 14 which is narrowed down thinly at the base thereof. The gas circulation hole 14 merges with a space of the inflator I.

A partition 15 is mounted inside the airbag 11. The partition 15 is disposed at the middle portion of the airbag 11 as viewed in the vertical direction, and divides the interior of the airbag 11 into an upper portion 11A and a lower portion 11B. The partition 15 is formed of cloth or is a knitted product, and the material or the form thereof is such as to allow passage of gas between the two divided chambers (that is, the upper portion 11A and the lower portion 11B). For example, as shown in FIG. 4(A), the partition 15 is formed by making the portion thereof disposed towards the open end 14 of the airbag 11 short. In this case, as simply shown in FIG. 4(B), a gas flow path S which connects the upper portion 11A and the lower portion 11B is formed inside the airbag 11. In another example, the partition 15 is formed by also making the portion thereof towards the front side of the airbag 11 short, in which case, as shown in FIG. 4(C), two gas flow paths S and S' can be formed. Cutaway portions 15a are formed, one in each edge of the partition 15. The outer peripheral edges of the partition 15 are attached to the inside surface of the airbag 11 by, for example, sewing or welding. The cutaway portions 15a of the partition 15 allow the substantially middle locations of both side cloths 13 of the airbag 11 (portions where the cutaway portions 15a of the partition wall 15 are attached) to be brought towards each other, thereby forming inwardly extending depressions d.

A description of a modification of the partition 15 will be given later.

A description of the operation of the airbag device having the above-described structure will be given.

In the usual state of a vehicle, the airbag 11 is accommodated in a folded state in the retainer R. When the vehicle collides, a sensor (not shown) detects the collision, and sends an ignition signal to an initiator of the inflator I. The initiator is ignited, and a propellant is ignited, thereby producing spread gas from the inflator I. There is also a type of airbag device which is spread using accumulated pressure of inactive gas.

The spread gas that has been produced flows inside the airbag 11 after passing through the gas circulation hole 14. As shown in FIGS. 1(A) and 1(B), the airbag 11 expands and spreads in front of the occupant H. As shown in FIG. 1(B), at the time of completion of the spreading of the airbag 11, the depressions d, disposed at substantially the central portions of the side cloths 13a and 13b, are depressed inward, so that the front surface of the airbag 11 is shaped like a package.

As shown in FIGS. 2(A) and 2(B), the occupant H moves forward due to inertial force and hits the spread airbag 11. This causes the airbag 11 to be pushed and squashed as a result of being sandwiched among the instrument panel P and the windshield F and the occupant H. At this time, the depressions d make it difficult for the gas at the lower portion inside the airbag 11 to escape towards the upper portion, so that the resistance of the lower portion 11B of the bag acts uniformly upon the lower portion of the upper body (from the waist to the chest) of the occupant H. As shown in FIG. 2(B), the upper portion 11A and the lower portion 11B of the airbag 11 are substantially equally horizontally spread.

The resistance acting in the airbag when a load is applied will be described in more detail with reference to FIGS. 3 to 16.

An external force α equivalent to the force produced by the body of the occupant acts upon the airbag 11 shown in FIG. 3(B) from the front surface thereof. Here, as long as the portions where the depressions d of the airbag 11 are formed are not spread to the sizes of other portions, the depressions d limit the movement of the gas inside the bag. As described above and as shown schematically in FIGS. 16(C) and 16(D), in the conventional airbag, the airbag 103 escapes towards a region of lower resistance in the directions of empty arrows inside the bag 103, so that the resistance with respect to the load body f becomes small, thereby making it easy for the bag to become squashed. On the other hand, as shown schematically in FIGS. 3(C) and 3(D), air in the airbag 11 of the present invention cannot easily escape in the direction of the upper portion 11A of the bag, thereby making it possible to produce a large resistance with respect to a load body f at the lower portion 11B. This causes the lower portion of the airbag 11 to have sufficient resistance.

Although the embodiment has been described by taking as an example the case where the depressions d are formed in substantially the central portions of the airbag 11 by placing one partition inside the bag, various modifications may be made as described below.

Hereunder, modifications will be given in terms of the front surface of the airbag during expansion thereof with reference to FIGS. 5(A)–5(E).

FIGS. 5(A) to 5(E) are schematic plan views of the forms of the front surface of the air bag when it has finished spreading.

Figure 5A:
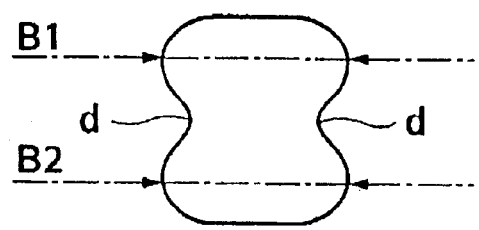
FIGS. 5(A) to 5(E) are schematic plan views of the forms of the front surface of the air bag when it has finished spreading.

The form shown in FIG. 5(A) is the same as that shown in FIGS. 1(B) and 2(B). More specifically, in this case, the depressions d are formed in substantially the central portions of the side surfaces of the airbag, and a maximum width B1 of the upper portion of the bag and a maximum width B2 of the lower portion thereof are substantially equal to each other.

Figure 5B:
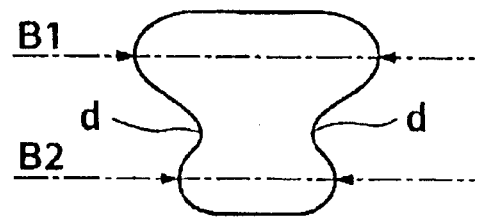

In the form shown in FIG. 5(B), the depressions d are formed closer to the bottom portion of the airbag, and a maximum width B1 of the upper portion of the bag is greater than a maximum width B2 of the lower portion of the bag.

Figure 5C:
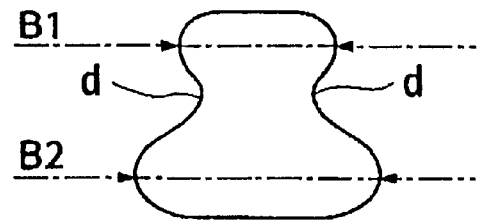

In the form shown in FIG. 5(C), which is the reverse form of that shown in FIG. 5(B), the depressions d are formed closer to the top portion of the airbag, and a width B1 of the upper portion of the bag is less than a width B2 of the lower portion of the bag.

Figure 5D:
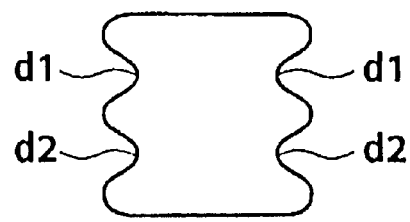

In the form shown in FIG. 5(D), depressions d1 and depressions d2 are formed in two levels in the bag.

Figure 5E:
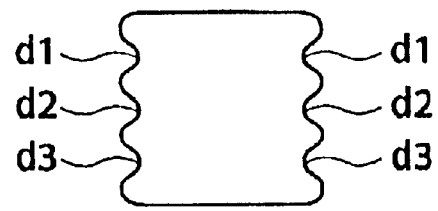

In the form shown in FIG. 5(E), three levels of depressions d1, depressions d2, and depressions d3 are formed in the bag. More than three levels of such depressions may also be formed.

Modifications of the structure of the airbag will be given. Specific Examples of Airbags Having Three-Piece Structures Using a Tether Strap or Tether Straps Specific examples of airbags using tether straps will be described with reference to FIGS. 6(A)–7(D). The characteristic of this type of airbag is that a tether strap or tether straps are used instead of the partition used in the above-described airbag 11.

Figure 6A:
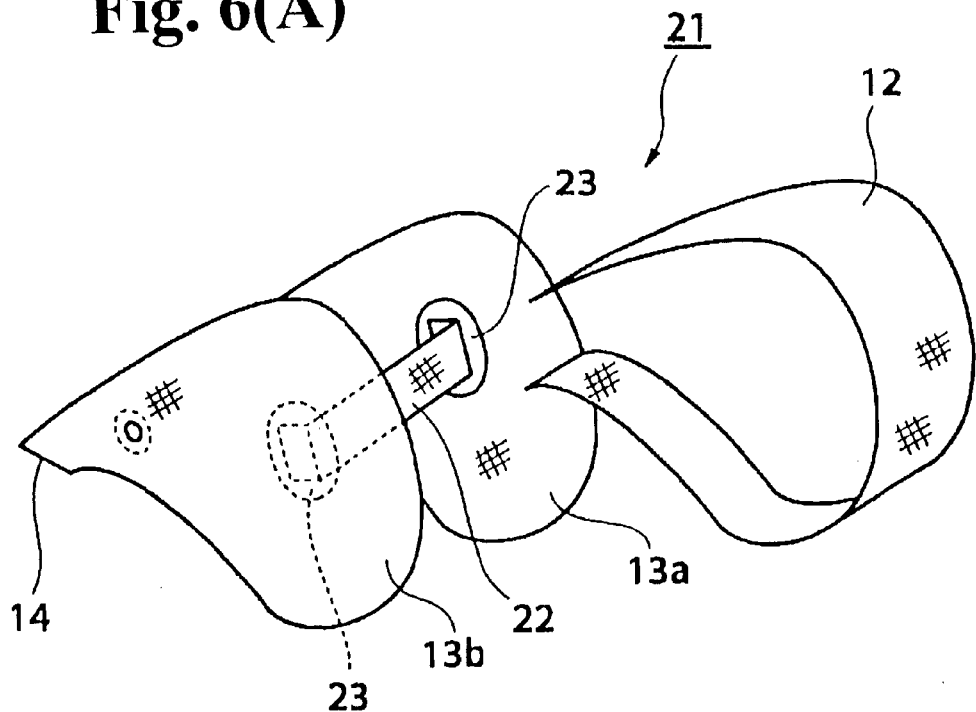
FIG. 6(A) is an exploded perspective view of a structural example of an airbag using one tether strap.
Figure 6B:
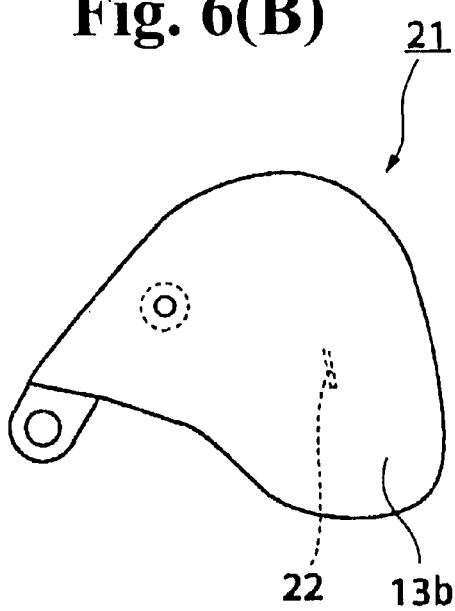
FIG. 6(B) is a side view of the airbag shown in FIG. 6(A)
Figure 6C:
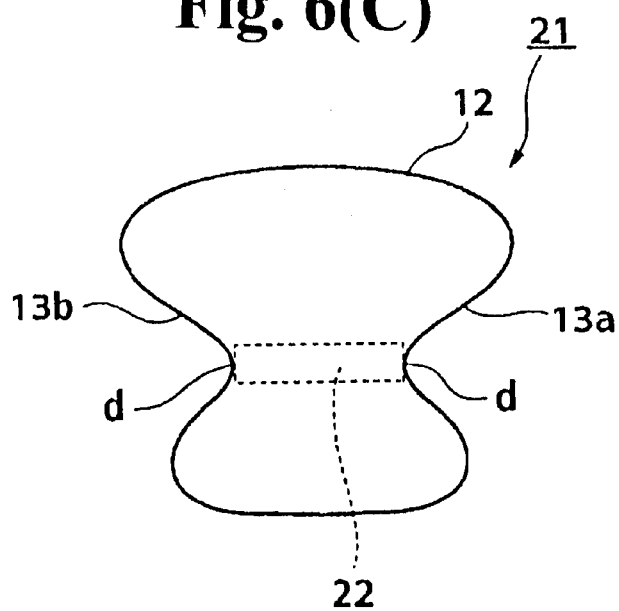
FIG. 6(C) is a front view of the airbag shown in FIG. 6(B)

FIG. 6(A) is an exploded perspective view of a structural example of an airbag using one tether strap. FIG. 6(B) is a side view of the airbag. FIG. 6(C) is a front view of the airbag.

FIG. 7(A) is a schematic side view of a top-dash-mount-type passenger airbag device using two tether straps. FIG. 7(B) is a front view of the airbag shown in FIG. 7(A). FIG.

7(C) is a sectional view taken along line 7(C)—7(C) of FIG. 7(A). FIG. 7(D) is a sectional view taken along line 7(D)—7(D) of FIG. 7(A).

In an airbag 21 shown in FIGS. 6(A)–6(C), a tether strap 22 is provided in a tensioned state between both side surface cloths 13a and 13b of the airbag having a three-piece structure. The tether strap 22 is a string-like or strip-like member which is formed of cloth or which is a knitted product. The ends of the tether strap 22 are sewed to the corresponding side surface cloths 13a and 13b through corresponding reinforcing cloths 23. The side surface cloths 13a and 13b are brought inwardly towards each other by the tether strap 22, and depressions d (see FIG. 6(C)) are formed where the ends of the tether strap 22 are sewed.

In an airbag 25 shown in FIGS. 7(A)–7(D), two tether straps 22 of the same type as that used in the airbag 21 shown in FIGS. 6(A)–6(C) are sewed in two levels. In this case, two levels of depressions d1 and d2 are formed in the side surfaces of the airbag 25 in correspondence with the two tether straps 22. The form of the front surface of the airbag 22 at the time of expansion thereof is that shown in FIG. 7(B). It is the same as the form of the front surface of the airbag shown in FIG. 5(D).

Specific Example of Airbag Having a Three-Piece Structure Using a Tucked Seam

A specific example of an airbag using a tucked seam will be described with reference to FIGS. 8(A)–8(C). The characteristic of this type of airbag is that depressions are formed by a tucked seam without using a tether strap or tether straps or the partition used in the above-described airbag 11.

Figure 8A:
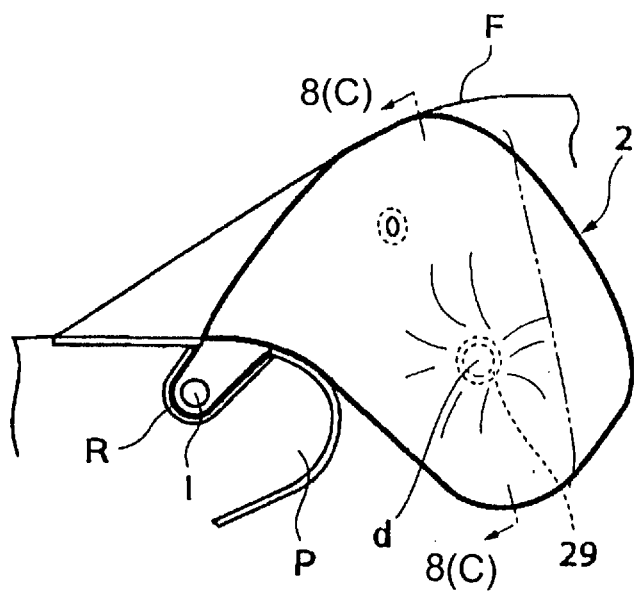
FIG. 8(A) is a schematic side view of a top-dash-mount-type passenger airbag device using a tucked seam.

FIG. 8(A) is a schematic side view of a top-dash-mount-type passenger airbag device using a tucked seam. FIG. 8(B) is a front view of the airbag shown in FIG. 8(A). FIG. 8(C) is a sectional view taken along line 8(C)—8(C) of FIG. 8(A).

Figure 8B:
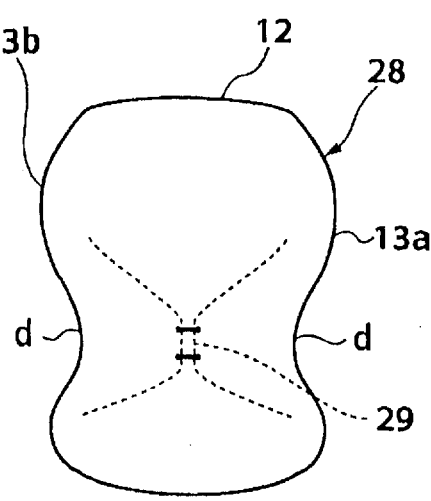
FIG. 8(B) is a front view of the airbag shown in FIG. 8(A)
Figure 8C:
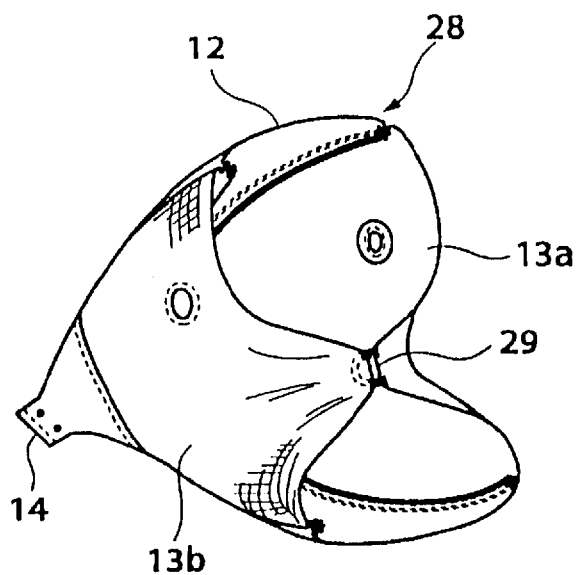
FIG. 8(C) is a sectional view taken along line 8(C)—8(C) of FIG. 8(A)

In an airbag 28 shown in FIGS. 8(A)–8(C), a tucked seam 29 is formed at portions of both side surface cloths 13a and 13b of the airbag having a three-piece structure. The side surface cloths 13a and 13b are brought towards each other and joined at the tucked seam 29, and a depression d is formed at the sewed portion thereof. The locations and number of depressions can be increased by forming tucked seams 29 at a plurality of locations.

Specific Examples of Airbags Having Two-Piece Structures

Hereunder, a description of specific examples of airbags having two-piece structures will be given.

Figure 9A:
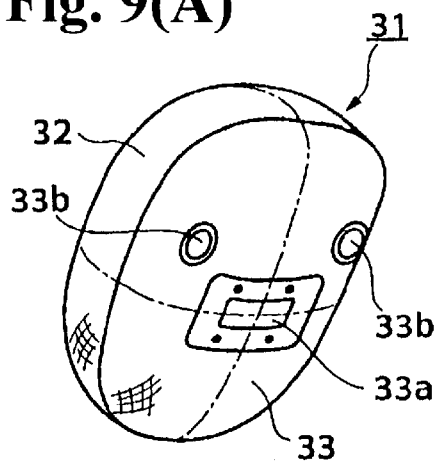
FIG. 9(A) is a perspective view of an example of an airbag having a two-piece structure.
Figure 9B:
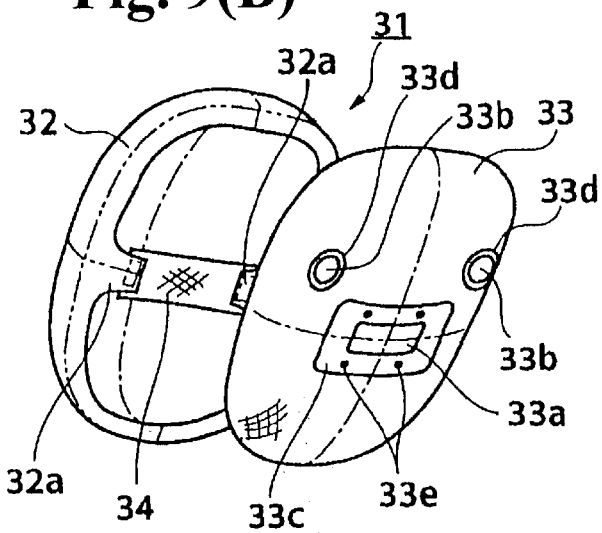
FIG. 9(B) is an exploded perspective view of the airbag shown in FIG. 9(A)
Figure 9C:
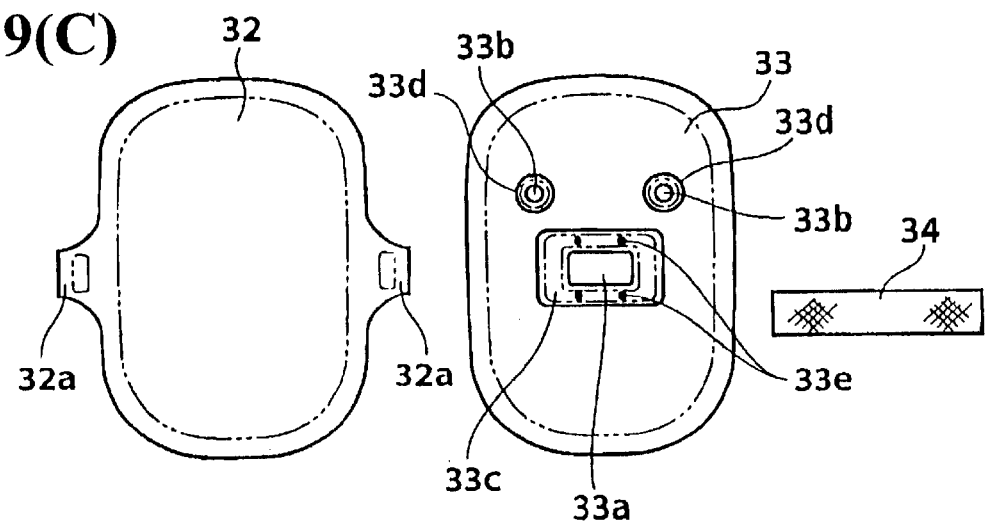
FIG. 9(C) is an exploded plan view of the airbag shown in FIG. 9(A)
Figure 9D:
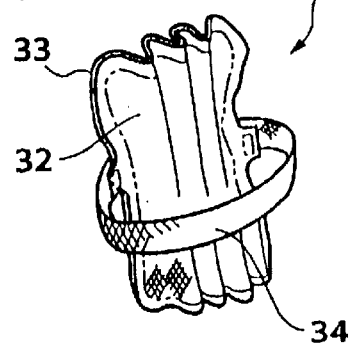
FIGS. 9(D) and 9(E) are perspective views used to illustrate the procedure of assembling the airbag shown in FIG. 9(A)
Figure 9E:
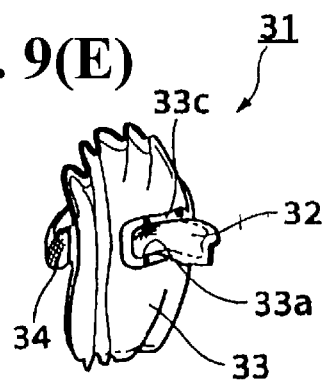

FIG. 9(A) is a perspective view of an example of an airbag having a two-piece structure. FIG. 9(B) is an exploded perspective view of the airbag. FIG. 9(C) is an exploded plan view of the airbag. FIGS. 9(D) and 9(E) are perspective views used to illustrate the procedure of assembling the airbag.

Figures 10A, 10B:
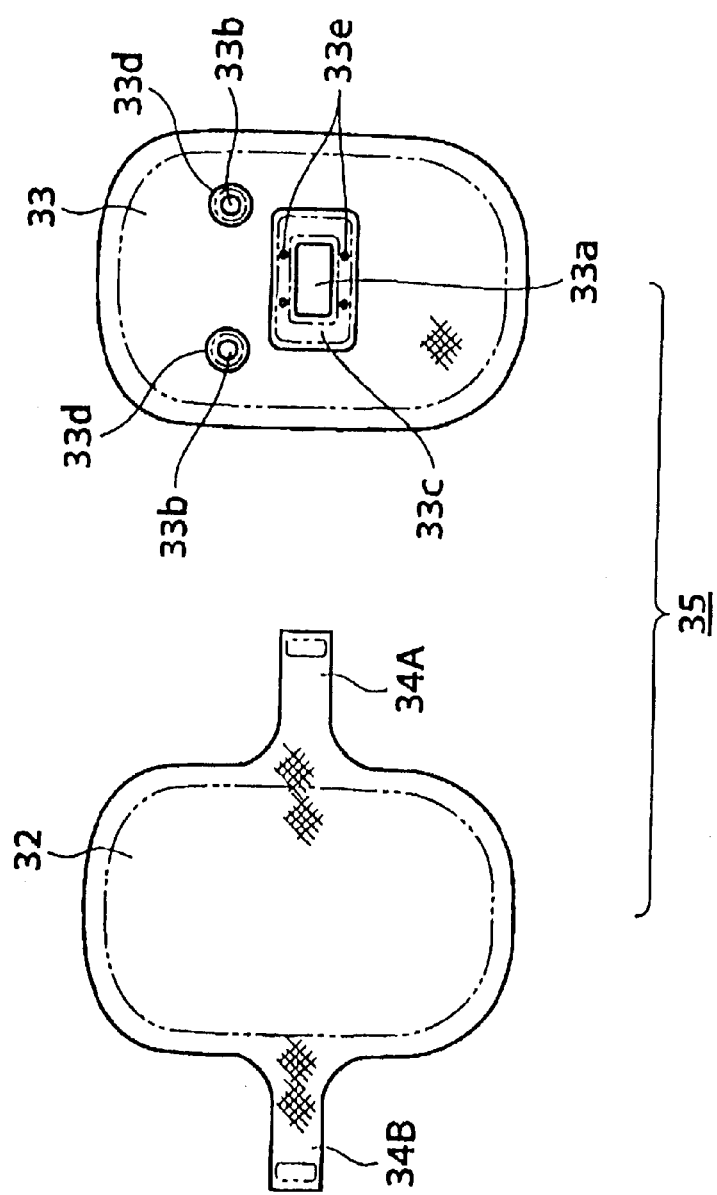
FIG. 10(A) is an exploded plan view of another example of the airbag having a two-piece structure.
FIG. 10(B) is a perspective view used to illustrate the procedure of assembling the airbag shown in FIG. 10(A)

FIG. 10(A) is an exploded plan view of another example of the airbag having a two-piece structure. FIG. 10(B) is a perspective view used to illustrate the procedure of assembling the airbag.

FIGS. 11(A)–11(H) are used to illustrate the procedure of assembling the airbag having a two-piece structure.

In an airbag 31 shown in FIGS. 9(A)–9(E), a cloth front panel 31 (at the side of an occupant) and a back panel 33 (at the side of an instrument panel) are integrally sewed together into the shape of a bag. As simply shown in FIG. 9(C), both of the panels 32 and 33 are elliptical. As most simply shown in FIGS. 9(B) and 9(C), protruding ears 32a are formed, one on each of the two sides of the front panel 32. A tether strap 34 is provided in a tensioned state between both ears 32a.

As most simply shown in FIGS. 9(B) and 9(C), a rectangular gas circulation hole 33a is formed in the center of the back panel 33. In addition, two circular vent holes 33b are formed in the back panel 33. A reinforcing cloth 33c is sewed along the periphery of the gas circulation hole 33a of the back panel 33 and reinforcing cloths 33d are sewed along the peripheries of the corresponding vent holes 33b. Holes 33e are formed in the reinforcing cloth 33c, sewed along the periphery of the gas circulation hole 33a.

The ears 32a used for mounting the tether strap 34 may be formed at the back panel 33.

In an airbag 35 shown in FIGS. 10(A) and 10(B), tether straps of the type used in the airbag 31 shown in FIGS. 9(A)–9(E) are integrally provided at a front panel. More specifically, as shown in FIG. 10(A), the airbag 35 comprises tether straps 34A and 34B, one extending from each side of a front panel 32.

In this case, the tether straps 34A and 34B may be provided at a back panel 33.

An airbag 38 shown in FIGS. 11(A)–11(H) comprises a package-shaped front panel 32' and a package-shaped back panel 33', each of which has a cutaway portion 39, and has a two-piece structure without a tether strap. In the airbag 38, depressions are formed where the cutaway portions 39 are formed.

The airbags 31, 35, and 38 are assembled using the following procedure.

(1) The reinforcing cloth 33c and the reinforcing cloths 33d are aligned with positioning holes that are previously formed in the back panel 33 (33'), and are sewed to the back panel 33 (33'). Then, the gas circulation hole 33a and the vent holes 33b are formed by cutting operations. (See FIGS. 11(A) to 11(C).)

(2) Outer surfaces (as viewed in the state shown in FIG. 9(A)) of the front panel 32 (32') and the back panel 33 (33') are positioned so as to oppose each other, and are placed upon each other in order to sew them together along their outer peripheries. (See FIGS. 11(D) and 11(E).)

(3) (For the airbag 31 shown in FIG. 9(A))

As shown in FIG. 9(D), the tether strap 34 is sewed to both ears 32a of the front panel 32.

(3') (For the airbag 35 shown in FIG. 10(A)) As shown in FIG. 10(B), the ends of the tether straps 34A and 34B that protrude from the front panel 32 are placed upon each other and are sewed together.

These steps are not required for the airbag 38 shown in FIGS. 11(A)–11(H)

Figure 11A:
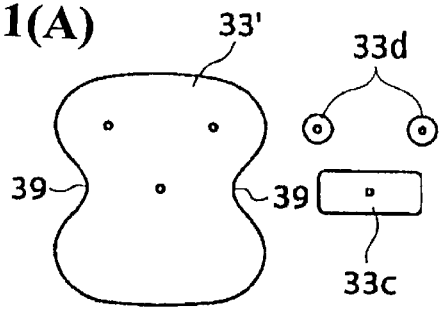
FIGS. 11(A)–11(H) are used to illustrate the procedure of assembling the airbag having a two-piece structure.
Figure 11B:
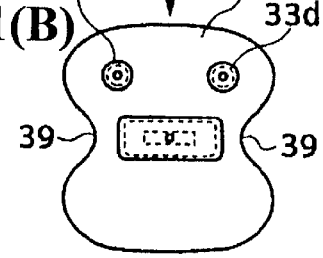
Figure 11C:
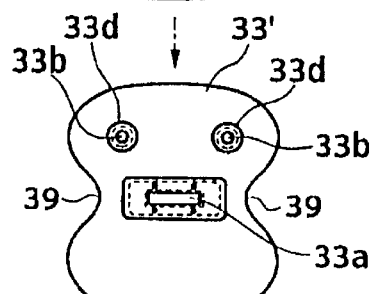
Figure 11D:
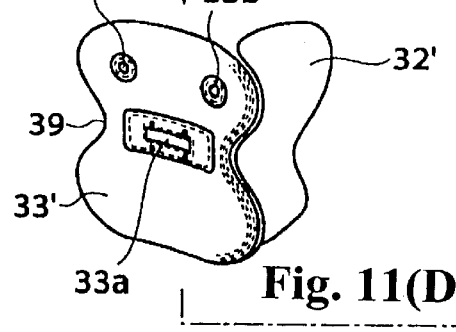
Figure 11E:
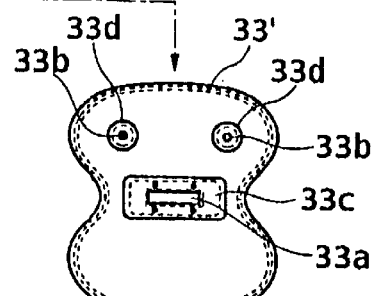
Figure 11F:
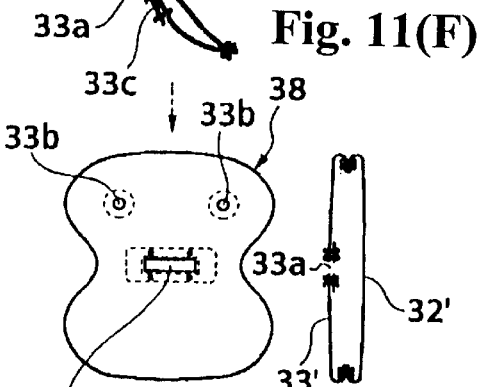
Figure 11G:
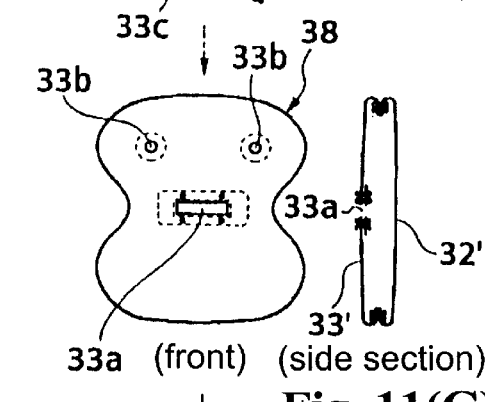
Figure 11H:
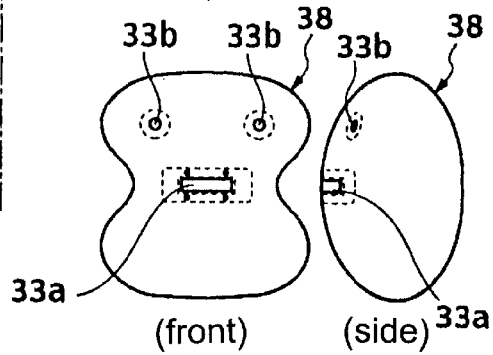

(4) As shown in FIGS. 9(D) and 11(E), the front panel 32 (32') is pulled out from the gas circulation hole of the back panel 33 (33'), and the inside and outside surfaces of both panels 32 and 33 (32' and 33') that have been sewed together are reversed.

In the airbags 31, 35, and 38, depressions are formed where the tether strap 34, the tether straps 34A and 34B, and the cutaway portions 39 are formed, respectively. The shapes of the front surfaces of the airbags 31, 35, and 38 when they have finished spreading are as shown in FIG. 5(A). By moving the tether strap or tether straps or the cutaway portions vertically in the upward direction or the downward direction, the airbags 31, 35, and 38 can take the form shown in FIGS. 5(B) or 5(C). In addition, by providing the tether straps or the cutaway portions in two or three levels, they can take the form shown in FIGS. 5(D) or 5(E).

Specific Examples of Airbags Having One-Piece Structures

Hereunder, a description of specific examples of cases where the present invention is applied to airbags having one-piece structures will be given.

Figure 12A:
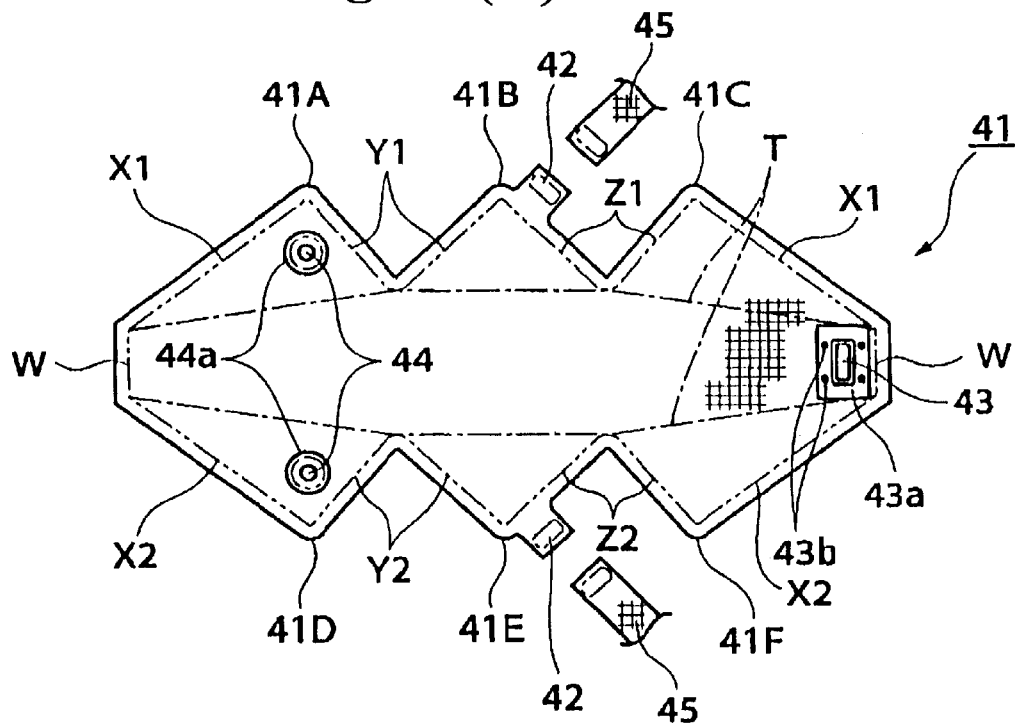
FIG. 12(A) is a plan view of an example of an airbag having a one-piece structure.
Figure 12B:
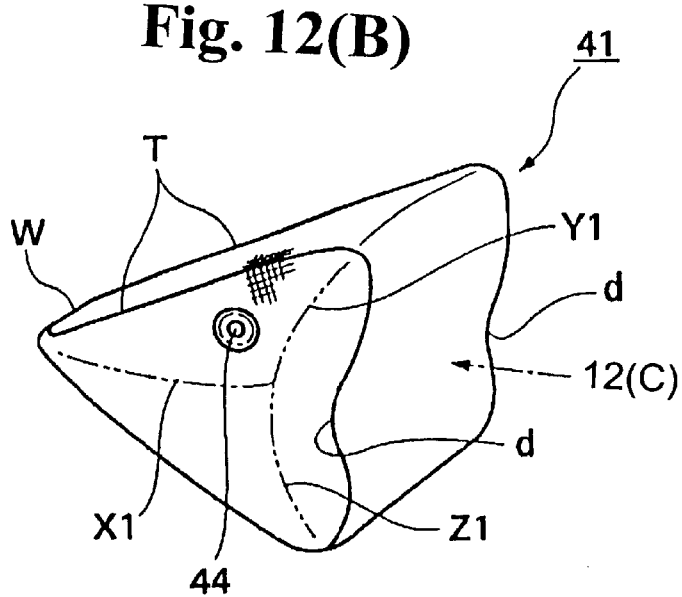
FIG. 12(B) is a perspective view of the airbag formed from the one-piece structure.
Figure 12C:
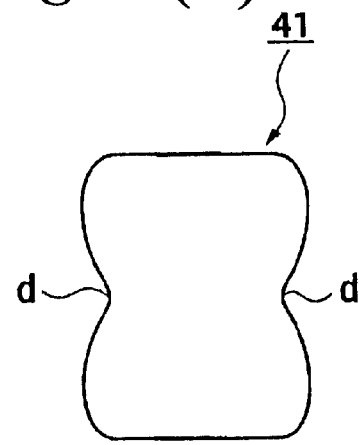
FIG. 12(C) is a front view (in the direction of arrow 12(C) in FIG. 12(B)) when the airbag has finished spreading.

FIG. 12(A) is a plan view of an example of an airbag having a one-piece structure. FIG. 12(B) is a perspective view of the airbag. FIG. 12(C) is a front view (in the direction of arrow 12(C) in FIG. 12(B)) when the airbag has finished spreading.

Figure 13A:
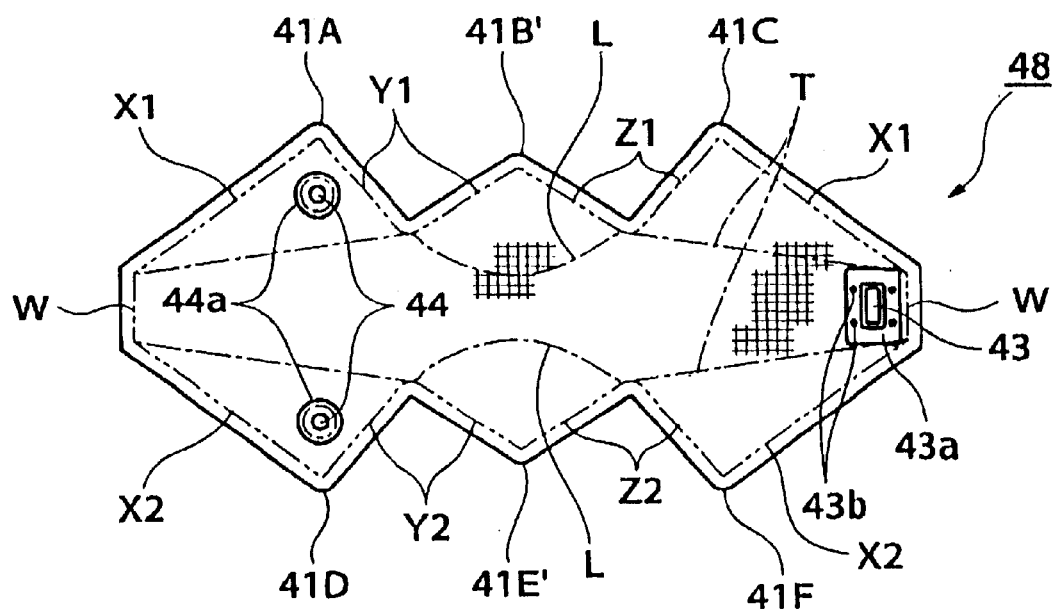
FIG. 13(A) is a plan view of another example of the airbag having a one-piece structure.
Figure 13B:
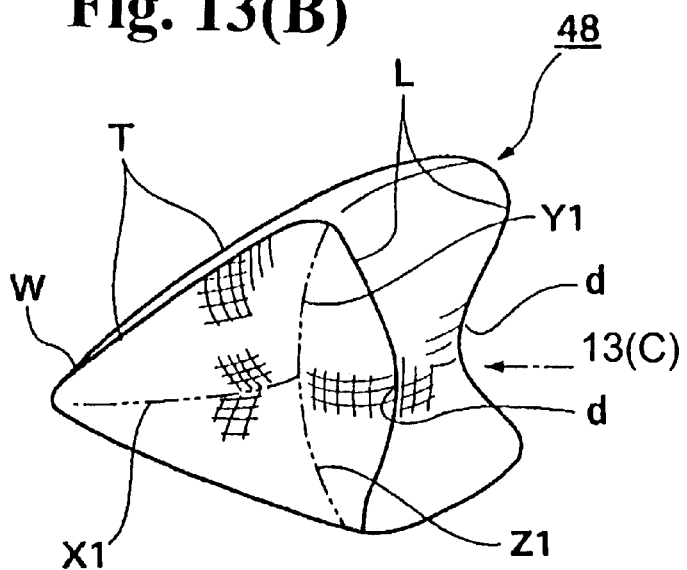
FIG. 13(B) is a perspective view of the airbag shown in FIG. 13(A)
Figure 13C:
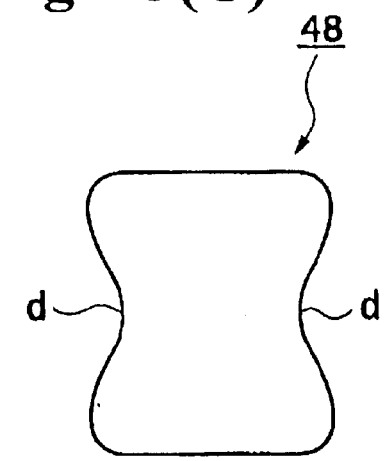
FIG. 13(C) is a front view (in the direction of arrow 13(D) in FIG. 13(B)) when the airbag has finished spreading.
Figure 15A:
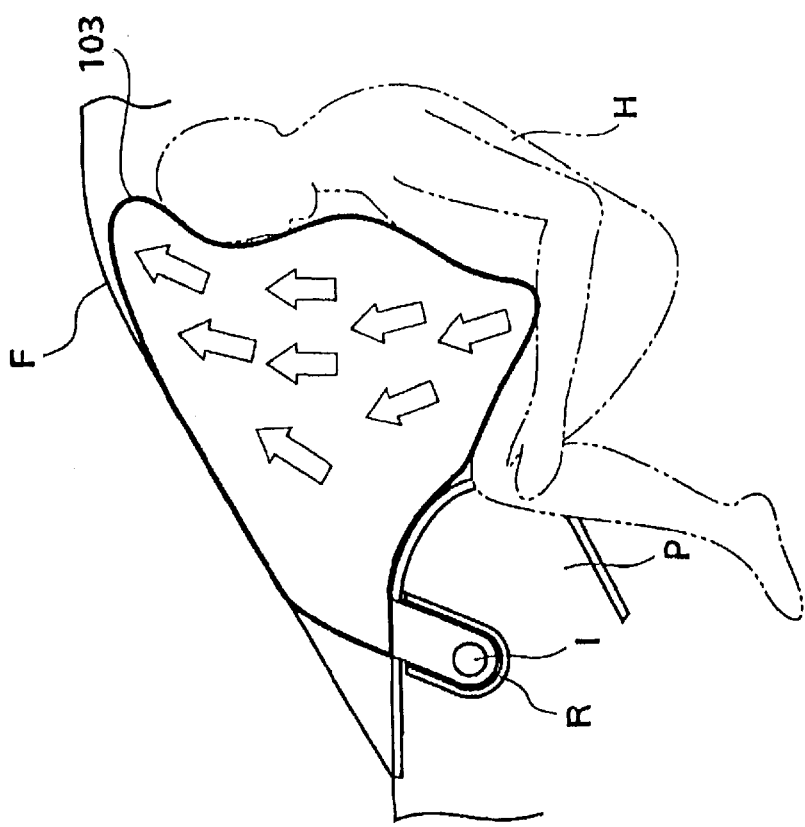
FIG. 15(A) is a schematic side view used to illustrate the form of the conventional passenger airbag device when a load acts thereupon (that is, when an occupant moves forward)
Figure 15B:
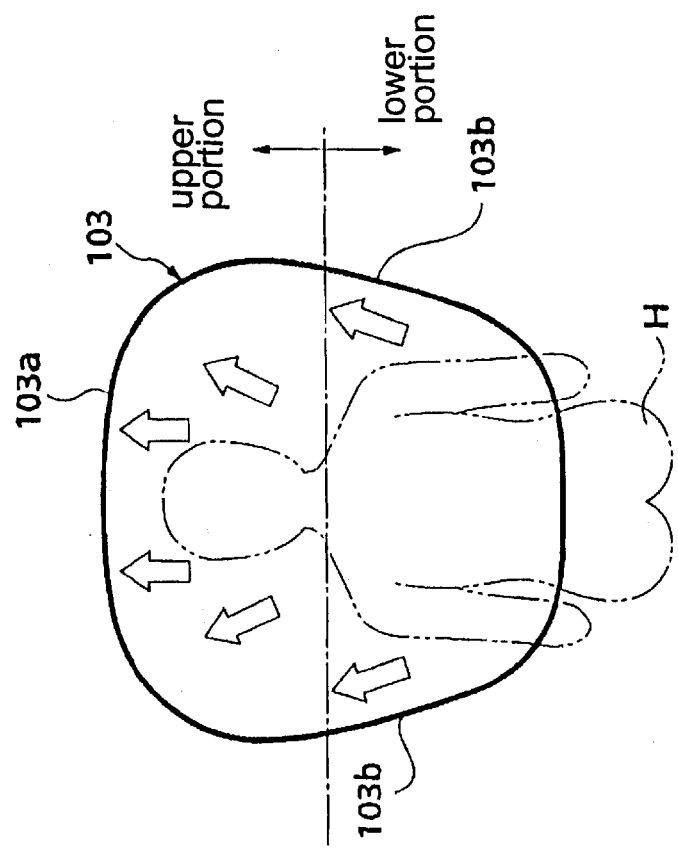
FIG. 15(B) is a front view thereof.

FIG. 13(A) is a plan view of another example of the airbag having a one-piece structure. FIG. 13(B) is a perspective view of the airbag. FIG. 13(C) is a front view (in the direction of arrow 13(C) in FIG. 13(B)) when the airbag has finished spreading.

An airbag 41 shown in FIGS. 12(A)–12(C) is previously formed into the shape of a bag. Triangular protruding portions 41A to 41F are formed, three on each side of the airbag 41. The center protruding portions 41B and 41E have ears 42. A tether strap 45 is provided in a tensioned state between both ears 42.

As shown in FIG. 12(A), a gas circulation hole 43 is formed in the illustrated right end of the airbag 41, and two vent holes 44 are formed towards the left end thereof. A reinforcing cloth 43a and reinforcing cloths 44a are sewed along the periphery of the gas circulation hole 43 and the peripheries of the vent holes 44, respectively. Holes 43b are formed in the reinforcing cloth 43a formed along the periphery of the gas circulation hole 43.

As shown in FIG. 12(B), the airbag 41 is formed into a three-dimensional form by sewing together, as shown in FIG. 12(B), sewing lines, formed along the outer periphery thereof, having the same reference numerals (X1, X2, Y1, Y2, Z1, Z2, and W), and by accommodating a tether strap 45 inside the airbag 41. Reference numeral T denotes edge lines. In this case, the front surface has the shape of a package as shown in FIG. 12(C).

In an airbag 48 shown in FIGS. 13(A)–13(C), protruding portions 41B' and 41E' such as those used in the airbag 41 shown in FIGS. 12(A)–12(C) are formed smaller than the other protruding portions 41A, 41C, 41D, and 41F, and no tether straps are used. By forming the protruding portions 41B' and 41E' smaller, arcuate edge lines L are formed in the state shown in FIG. 13(B) after the sewing operation. In the airbag 48, the front surface also has the shape of a package as shown in FIG. 13(C).

Modification of Partition-Type Airbag

Hereunder, a description of a modification of a partition-type airbag will be given.

Figure 17A:
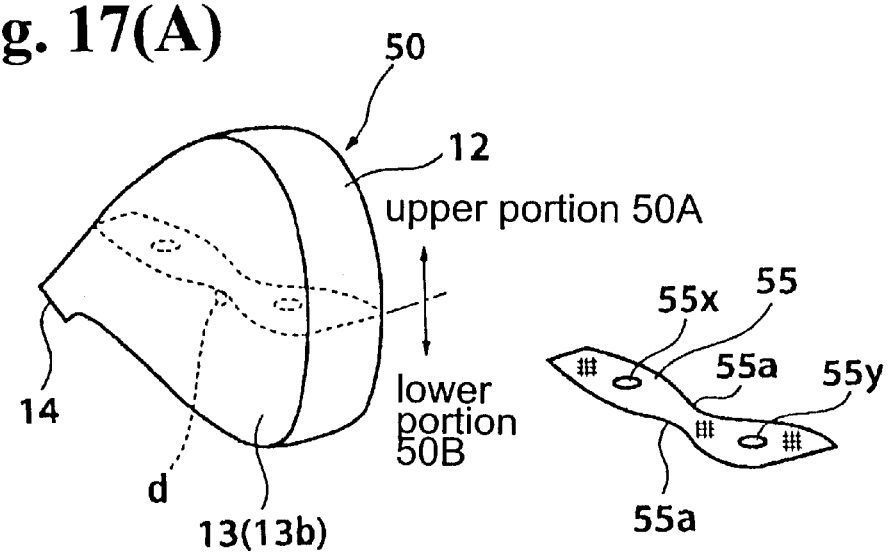
FIG. 17(A) is a perspective view of another example of the partition-type airbag of the invention.
Figure 17B:
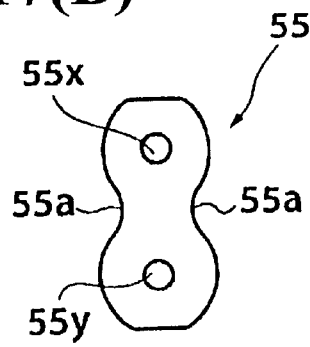
FIG. 17(B) is a plan view of a partition of the airbag shown in FIG. 17(A)
Figure 17C:
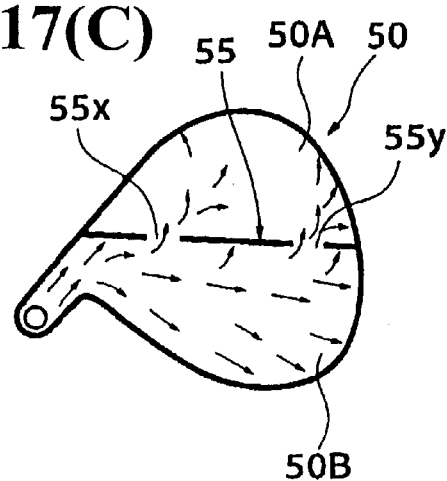
FIG. 17(C) is a vertical sectional view of FIG. 17(A)
Figure 17D:
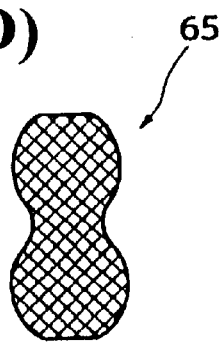
FIG. 17(D) is a plan view of another example of the partition wall.
Figure 17E:
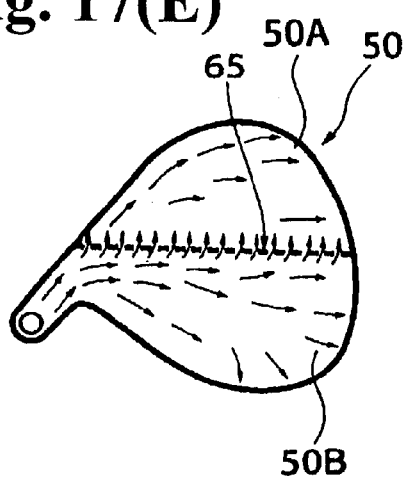
FIG. 17(E) is a vertical sectional view of the airbag using the partition shown in FIG. 17(D).

FIG. 17(A) is a perspective view of another example of the partition-type airbag. FIG. 17(B) is a plan view of a partition of the airbag shown in FIG. 17(A). FIG. 17(C) is a vertical sectional view of FIG. 17(A). FIG. 17(D) is a plan view of another example of the partition wall. FIG. 17(E) is a vertical sectional view of the airbag using the partition shown in FIG. 17(D).

A partition 55 is mounted inside an airbag 50 shown in FIG. 17(A). The partition 55 is disposed at the middle portion of the airbag 50 as viewed in the vertical direction, and divides the inside of the airbag 50 into an upper portion 50A and a lower portion 50B. As simply shown in FIG. 17(B), the partition 55 has two holes 55x and 55y formed therein. As shown in FIG. 17(C), these holes 55x and 55y make it possible to connect the upper portion 50A and the lower portion 50B inside the airbag. Cutaway portions 55a are formed, one at each side edge of the partition 15. The outer peripheral edges of the partition 55 are attached to the inside surface of the airbag 50 by, for example, sewing or welding. As in the airbag 11 shown in FIGS. 4(A)–4(C), the cutaway portions 55a of the partition 55 form inwardly extending depressions d at substantially the middle portions thereof as viewed in the vertical direction.

The external shape of a partition 65 shown in FIG. 17(D) is the same as that of the partition 55 shown in FIG. 17(B) and does not have holes. The partition 65 is made of cloth or is a knitted product having high air permeability. In this case, as shown in FIG. 17(E), gas circulates almost uniformly over the entire surface of the partition 65.

As is clear from the foregoing description, according to the present invention, it is possible to provide an airbag having a more preferable spread form without increasing the output of an inflator.

What is claimed is:

1. An inflatable airbag for installation in front of a passenger compartment of a vehicle for protecting an occupant during an emergency, comprising, a rearwardly directed surface positioned to be contacted by the occupant when expanded, an end located at a side opposite to the rearwardly directed surface and having a hole for receiving an inflation gas, and laterally spaced side surfaces extending between the rearwardly directed surface and the end and being oriented substantially vertically in the passenger compartment, said side surfaces having inwardly extending depressions formed in a middle portion of each side surface of the airbag as viewed in a vertical direction and located away from the rearwardly directed surface to restrict movement of the inflation, gas inside the airbag when the occupant hits the inflated airbag.

2. An inflatable airbag for use in front of an occupant in a vehicle, said airbag being formed from a flexible material and comprising, a pair of laterally spaced generally vertically extending side panel portions when inflated, each having a middle portion, a central panel portion situated between said side panel portions to face the occupant, and lateral expansion limiting means engaging the middle portions of said side panel portions away from the central panel portion to form inward depressions therein to thereby restrict movement of inflation gas inside the airbag when the occupant hits the inflated airbag.

3. An inflatable airbag as claimed in claim 2, wherein said lateral expansion limiting means comprises flexible restraining means engaging and limiting lateral expansion of said side panel portions to form the inward depressions therein.

4. An inflatable airbag as claimed in claim 3, wherein said flexible restraining means is contained within said airbag and joined to said side panel portions, said flexible restraining means being dimensioned to restrict the lateral expansion of said side panel portions and thereby to reduce an inflated volume of the airbag.

5. An inflatable airbag as claimed in claim 3, wherein said flexible restraining means comprises means joining said side panel portions together.

* * * * *